Figure 1:
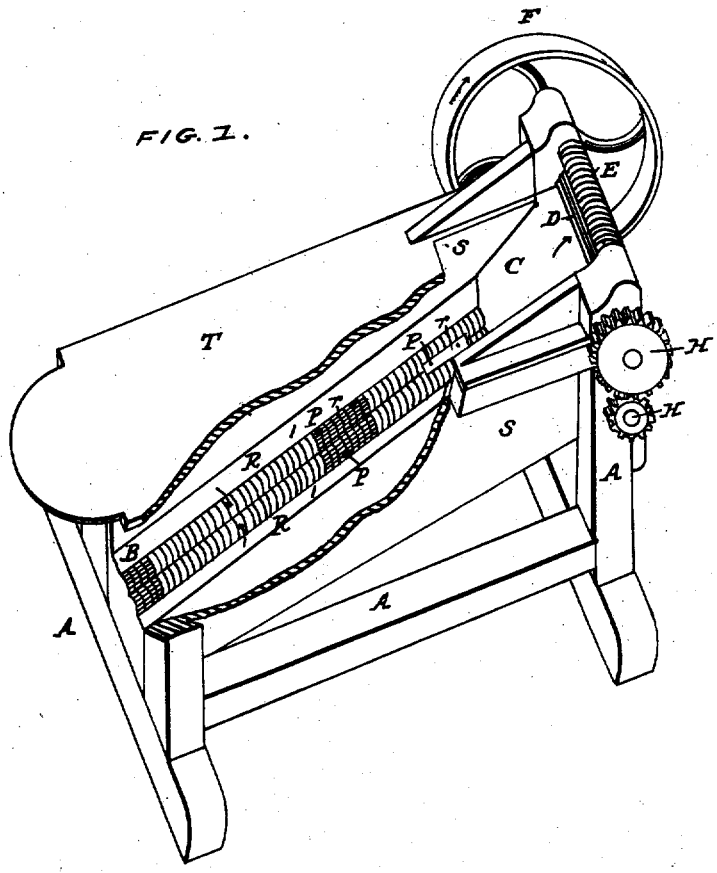

BEST AVAILABLE COPY

L. A. ASPINWALL.

Corn Husker.

No. 4,099. Reissued Aug. 16, 1870.

WITNESSES.

Abraham V De Witt

Fredk H Mann

INVENTOR.

L Augs Aspinwall

N. PETERS, Photo-Lithographer, Washington, D. C.

UNITED STATES PATENT OFFICE.

BEST AVAILABLE COPY

L. AUGUSTUS ASPINWALL, OF ALBANY, NEW YORK.

IMPROVEMENT IN MACHINES FOR HUSKING CORN.

Specification forming part of Letters Patent No. 101,809, dated April 12, 1870; Reissue No. 4,099, dated August 16, 1870.

*To all whom it may concern:*

Be it known that I, L. AUGUS. ASPINWALL, of the city and county of Albany, and State of New York, have invented certain new and useful Improvements in Corn-Huskers; and I declare the following specification, with the drawing forming a part thereof, to be a full and complete description of my invention.

Figure 2:
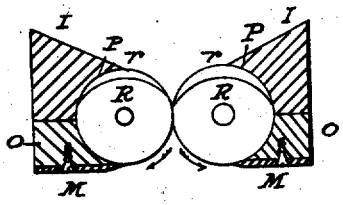
Figure 3:
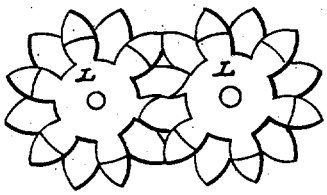

Figure 1 represents a perspective view of the machine, with a portion of the top and side broken away. Fig. 2 represents a section of the husking-rolls and cutters. Fig. 3 represents a section of the gear-wheels used upon the rolls.

Similar letters denote similar parts of the apparatus.

A A A is the frame of the machine. T is the top or table. F is the band-wheel on the shaft, upon which is the picker-roller D, having its surface grooved angular. Above this, and in combination with it, is the plain roller E. These serve to pick or remove the ears of corn from the stalks. Upon the same, with the fly-wheel, is the gear-wheel H, connecting with the pinion H, which gives motion to the husking-rolls R R by means of bevel-gears underneath the picker-roller D. (Not shown in the drawing.) The husking-rollers R R are placed upon an incline from the picker-roller, as in most machines. B B are boxes, in which the rolls revolve. C is the incline, upon which the ears are conducted to the rolls. Beneath this is another pair of boxes, which support the upper ends of the rolls, also a pair of double gears, which connect the rolls. (Not shown, owing to their small size, but may be seen in Fig. 3, L L.) S S′ are the sides. 1 1 are the beveled sides, to insure the keeping of the ears lengthwise with the rolls. Fig. 2 is a section of the rolls R R and the cutters M M, for the purpose of keeping the rolls free from husks.

The method of husking corn by means of rolls, as well as picking it from the stalks, is no new thing. Rubber rolls of various constructions have been used, also rubber and iron combined; but they lack durability. Iron rolls, provided with teeth upon the surface, have been used; but they shell the corn. Plain iron rolls fail to remove the husks.

It will be seen that the rolls R R are neither smooth nor provided with teeth upon the surface, but are made with depressed sections *r r*, turned eccentrically with reference to the rolls, as well as quartering, in order that the strain may be equalized. When the strain is not regarded the section may extend the entire length of the rolls on one side. These sections are provided with teeth P P, the points of which do not extend above the main surface of the rolls, which are certain to catch the husk and not shell the corn.

The sections in the respective pairs of rolls are made to come opposite each other, causing an opening of the rolls, in order that the husks may be loosened by the teeth in the depressions, and removed by the smooth surfaces coming in contact, so as not to shell the corn. The rolls may be made with depressions and teeth in but one, but the work will not be as rapid. Husking-rolls provided with teeth are liable to become wound around with the husks, and cannot be removed by means of scrapers. It is, therefore, necessary to use cutters, as seen in Fig. 2, M M.

The gear-wheels used upon husking-rolls of all machines must necessarily be small; consequently are subject to a heavy strain, and are liable to break quite often. To avoid this the gears L L, Fig. 3, are used, which are double, and may be tripled or quadrupled, having teeth opposite the spaces in each, which gives a constant bearing upon the pitch-line, and insures a stronger wheel, from the fact of there being double the number of teeth. Although this is not new in itself, the improvement consists in the application to husking-rolls.

The operation of the machine is thus: The power, being applied to the wheel F, gives motion to the picker-roller D, and, by means of the gear-wheel and pinion H motion is communicated to the rolls R R, all in the direction indicated by the darts. The stalks then being placed upon the table T, are fed, butts first, between D and E, where they are carried along, and the ears pinched off, dropping them upon the rolls R R, where the husks are removed, and the ears delivered at B B.

What I claim as my invention, and desire to secure by Letters Patent, is—

1. The husking-rolls R R, when provided (one or both) with depressions *r*, formed substantially as shown, and for the purpose set forth.

2. In combination with the rolls R R, constructed substantially as described, the double gears L L, as and for the purpose specified and set forth.

3. In combination with the depressions *r* of the rolls R R, the teeth P, as and for the purpose described.

4. The combination and arrangement of the knives M M with the rolls R R, constructed substantially as shown, and for the purpose set forth.

L. AUGS. ASPINWALL.

Witnesses:
A. V. DEWITT,
WM. T. VALENTINE.